June 13, 1939.  C. S. BULL ET AL  2,161,948
ELECTRICAL OSCILLATION GENERATOR
Filed Aug. 7, 1936
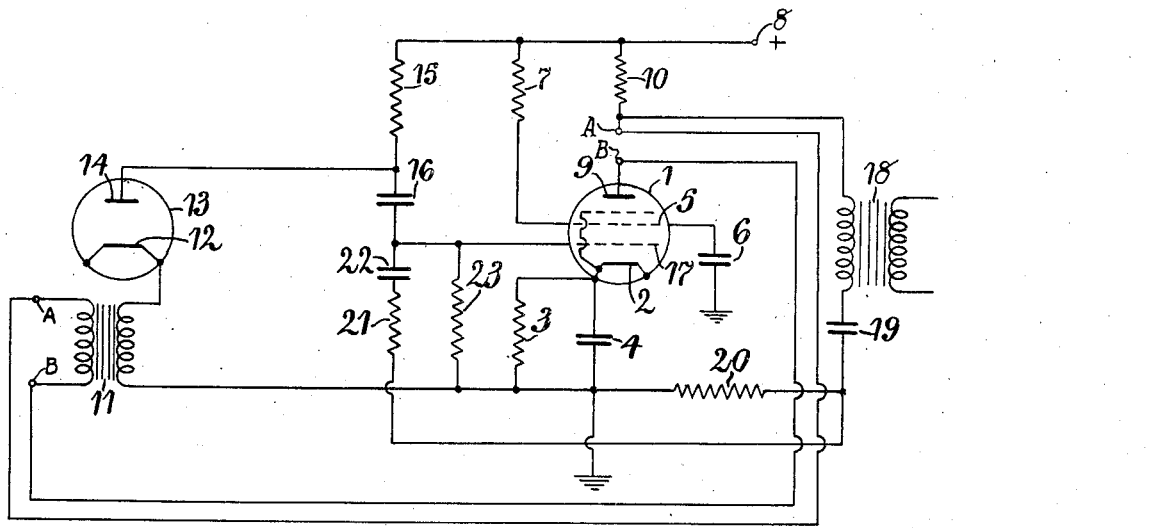
INVENTORS
CABOT SEATON BULL AND
WILLIAM SPENCER PERCIVAL
BY
ATTORNEY Patented June 13, 1939

2,161,948

UNITED STATES PATENT OFFICE 2,161,948

ELECTRICAL OSCILLATION GENERATOR

Cabot Seaton Bull, Uxbridge, and William Spencer Percival, Ealing, London, England, assignors to Electric & Musical Industries Limited, Hayes, Middlesex, England, a company of Great Britain Application August 7, 1936, Serial No. 94,792
In Great Britain August 12, 1935

4 Claims. (Cl. 250—36)

The present invention relates to electrical oscillation generators of the blocking oscillator type and more particularly but not exclusively to saw-tooth oscillation generators suitable for producing scanning oscillations in a cathode ray television system.

Hitherto it has been customary to employ one valve to generate saw-tooth oscillations of low current amplitude and another valve to convert these oscillations into oscillations of adequate power for operating for example, the magnetic deflecting system of a cathode ray tube.

It is an object of the present invention to provide a simplified saw-tooth oscillation generator.

According to the present invention, a circuit arrangement includes a thermionic valve in the input circuit of which a saw-tooth wave form is generated by charging a condenser arranged to be discharged by a unilaterally conducting device which is maintained nonconducting during charging of the condenser by a potential derived from the anode circuit of the valve. The unilaterally conducting device may be constituted by a diode valve which may be connected in series with a feed back path coupling the anode and control grid of a valve having a high amplification factor such as a valve of the pentode type. In a particular circuit arrangement according to the invention, the valve passes current during the charging period of the condenser. A capacitative potentiometer may be provided to feed the control grid of the valve with voltages derived from the anode of the diode.

In order that the invention may be more clearly understood and readily carried into effect a circuit arrangement designed to operate in accordance therewith will now be described with reference to the accompanying circuit diagram.

Referring to the circuit diagram, a pentode valve 1 has an indirectly heated cathode 2 connected to earth through a biasing resistance 3 shunted by a decoupling condenser 4. The screen-grid 5 of the valve 1 is connected to earth through a condenser 6 and through a resistance 7 to the positive terminal 8 of a suitable source of high tension current not shown in the diagram, the negative terminal of that source being connected to earth. The terminals marked A, B between the anode 9 of the valve 1 and one end of a resistance 10, the other end of which is connected to the positive terminal 8, are connected to the terminals marked A B on the primary winding of a transformer 11. The secondary winding of transformer 11 is connected between the cathode 12 of a diode 13 and earth. The anode 14 of the diode 13 is connected through a resistance 15 to the positive terminal 8 and also through a condenser 16 to the control grid 17 of the valve 1. The transformer 11 provides a retroactive coupling with the input circuit of the valve 1 through the diode 13. The end of the resistance 10 remote from terminal 8 is connected through the primary winding of an output transformer 18, a condenser 19 and a resistance 20 in series to earth. The common point of condenser 19 and resistance 20 is connected through resistance 21 and condenser 22 to the control grid 17 of the valve 1. A grid leak resistance 23 is provided between the control grid 17 and earth. The secondary winding of the transformer 18 is connected with the deflecting coils of a cathode ray tube or the deflecting coils may be connected directly in place of the primary winding of the transformer 18.

It will be seen that the condensers 16 and 22 form a capacitative potentiometer which steps down the voltage applied to the control grid 17 from the anode 14 of the diode 13. In order to obtain a short return time in the saw-tooth wave form to be generated, a strong retroactive coupling is required and this gives an oscillation of large amplitude on the anode of the diode 13. Such a voltage swing applied directly to the control grid 17 of the valve 1 would overload that valve and a distorted wave form would be produced. The capacitative potentiometer 16—22 thus serves to avoid this distortion by suitably reducing the voltage applied to the control grid 17.

The resistances 20 and 21 are included for the purpose of improving the wave form generated, the resistance 20 providing a negative reaction effect.

In order that the operation of the circuit arrangement may be understood it is convenient to assume an initial condition in which the anode 14 of diode 13 is at a negative potential with respect to the cathode 12. Current from the high tension source flows through the resistance 15 to charge the condensers 16 and 22, the anode 14 and control grid 17 both becoming increasingly positive. The increasing positive potential of the grid 17 causes an increase in the anode current of the valve 1. This current flows through the primary winding of the transformer 11 which is connected in such a sense that the increasing current maintains the cathode 12 of the diode 13 at a potential which is positive with respect to earth, and is constant during the linear increase of anode current.

As the potential of the anode 14 increases it will reach a point at which it becomes positive with respect to the cathode 12 and current then begins to flow in the diode 13. The rate at which the potential of the grid 17 of the valve 1 increases in the positive sense then becomes less and there is a consequent decrease in the rate at which the anode current of the valve 1 increases. Hence the positive potential of the cathode 12 of the diode 13 is reduced with a consequent increase in the current flowing through the diode. The grid 17 then begins to become less positive, the rate of change of anode current will change its sign and the cathode 12 of diode 13 will become negative with respect to earth. This causes the current in diode 13 to increase rapidly resulting in partial discharge of the condensers 16 and 22. The rate at which grid 17 becomes negative then decreases, the rate of change of the plate current falls off, the cathode 12 of diode 13 becomes less negative until current ceases to flow in diode 13 and the point at which the condenser 16 commences to be charged again is reached. This point corresponds with the beginning of the slow rise of the saw-tooth wave form generated. The complete cycle of operation is then completed.

It will be seen that the circuit has a natural period of oscillation but in order that the frequency of the oscillation may be strictly constant synchronising signal impulses are applied to a convenient point in the circuit. If, for example, the synchronising signal impulse is applied to the grid 17, amplification of the impulse is obtained and in consequence a smaller synchronising impulse is required than is usually necessary. It will be understood that the synchronising signal may be applied to other points in the circuit providing it is applied in such a sense as to produce the desired change in the potential of the electrode to which it is applied. Thus a negative synchronising signal applied to the screen-grid of the pentode valve 1 will produce the same effect as a negative signal applied to the control grid but without substantial amplification. If the synchronising signal is in the positive sense it may be applied to the cathode of the valve 1 and in such a case it is desirable to insert a resistance in series with the condenser 4. Again a negative synchronising signal applied to the cathode of the diode 13 will give the desired result.

In the arrangement described, the sawtooth wave form generated will take the form of a slow rise to the peak values and a rapid decline. The reverse form of saw-tooth may be generated by reversing the diode connections, the anode 14 being connected to the end of the secondary winding of transformer 11 and the cathode being connected through the resistance 15 to a negative potential instead of to the positive terminal 8. The condensers 16—22 will then be charged rapidly and discharged slowly.

Although the use of a pentode valve has been specified, it will be understood that any valve having a suitable amplification factor may be used.

We claim:—

1. An oscillation generator comprising a thermionic tube including anode, cathode and at least one control electrode, an electrical storage element connected in the control electrode-cathode circuit of said tube, a unilaterally conducting device, an energy transfer means, said energy transfer means and said unilateral conducting device being serially connected in said control electrode-cathode circuit of said tube, a source of potential electrically connected in series with said electrical storage element and between said anode and cathode for supplying operating potentials to said thermionic tube and for storing energy in said electrical storage element, means for transferring energy from the anode-cathode circuit of said tube to said energy transfer means for maintaining said unilaterally conducting device non-conducting during the periods of energy storing in the electrical storage element, and a load circuit connected in the anode-cathode circuit of said thermionic device.

2. An oscillation generator comprising a thermionic tube having anode, cathode and at least one control electrode, an electrical storage device connected in the control electrode-cathode circuit of said thermionic tube, a unilateral conducting tube, an electrical energy transfer means, a series circuit including said electrical storage device, said unilaterally conducting tube and said electrical energy transfer means, said unilaterally conducting device being arranged to discharge said storage device at predetermined time periods, and means coupling the anode-cathode circuit of said thermionic tube to said electrical energy transfer means for feeding energy to said unilateral conducting device to maintain said device nonconducting during periods of charging the storage device.

3. An oscillation generator as claimed in claim 2 wherein an additional storage device is serially connected in said series circuit, said storage devices in combination forming a potentiometer for controlling the potential applied to the control electrode of said thermionic tube.

4. An oscillation generator comprising a thermionic tube having an anode, cathode and at least one control electrode, an electrical energy storage device connected in the control electrode-cathode circuit of said tube, a unilaterally conducting electron tube, an electrical energy transfer means, a series circuit comprising said electrical storage device, said unilaterally conducting electron tube and said electrical energy transfer device, means coupling said electrical energy transfer means to the anode-cathode circuit of said tube for feeding energy from said anode-cathode circuit to the control electrode-cathode circuit of said thermionic tube and for maintaining during predeterminated time periods the unilaterally conducting electron tube in a non-conducting state, and a voltage source connected in series with said electrical energy storage device and between said anode and cathode for supplying operating potential to the anode of the tube and for supplying energy to said electrical energy storage device.

CABOT SEATON BULL.
WILLIAM SPENCER PERCIVAL.